C. F. BLACK.
STARCH SHOVEL.
APPLICATION FILED OCT. 30, 1911.
1,131,318.
Patented Mar. 9, 1915.
6 SHEETS—SHEET 3.
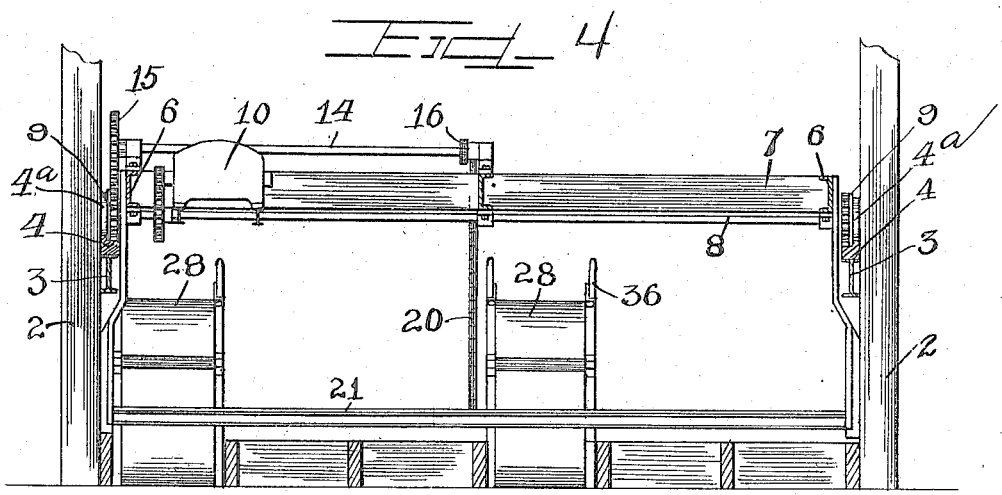
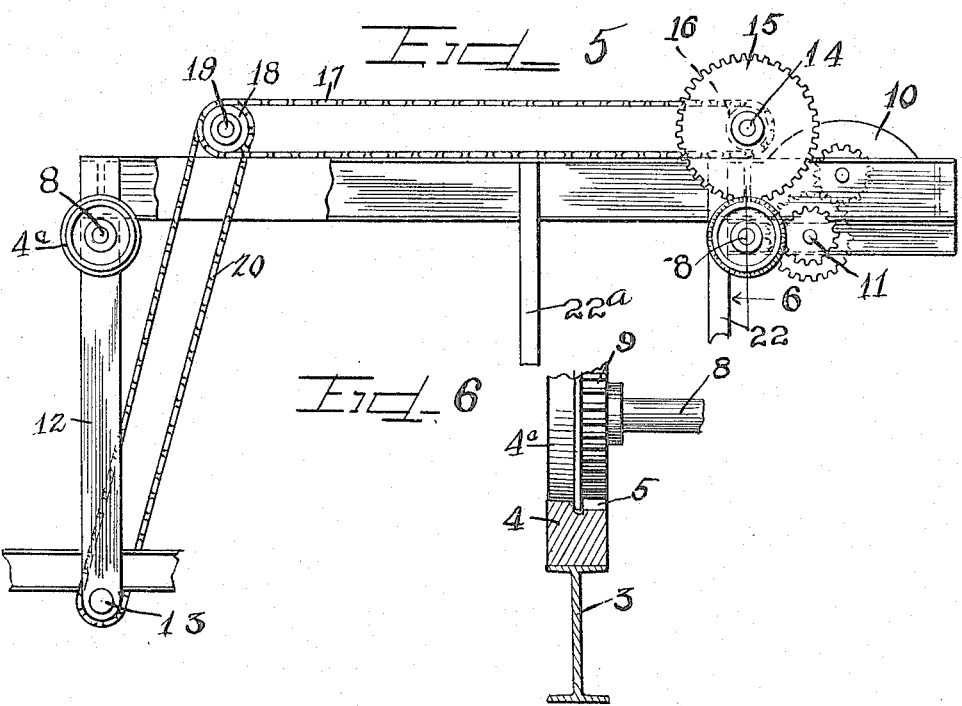

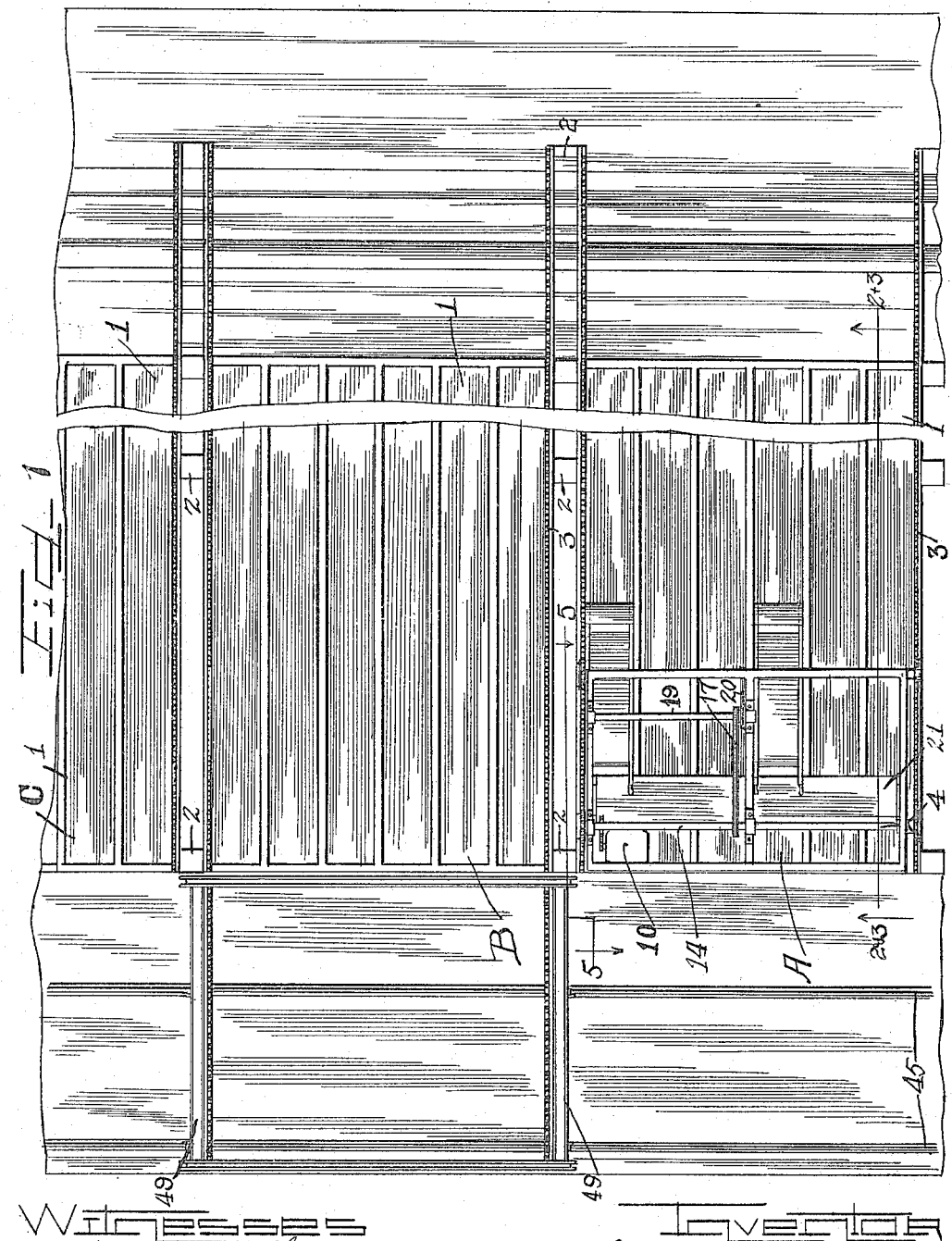

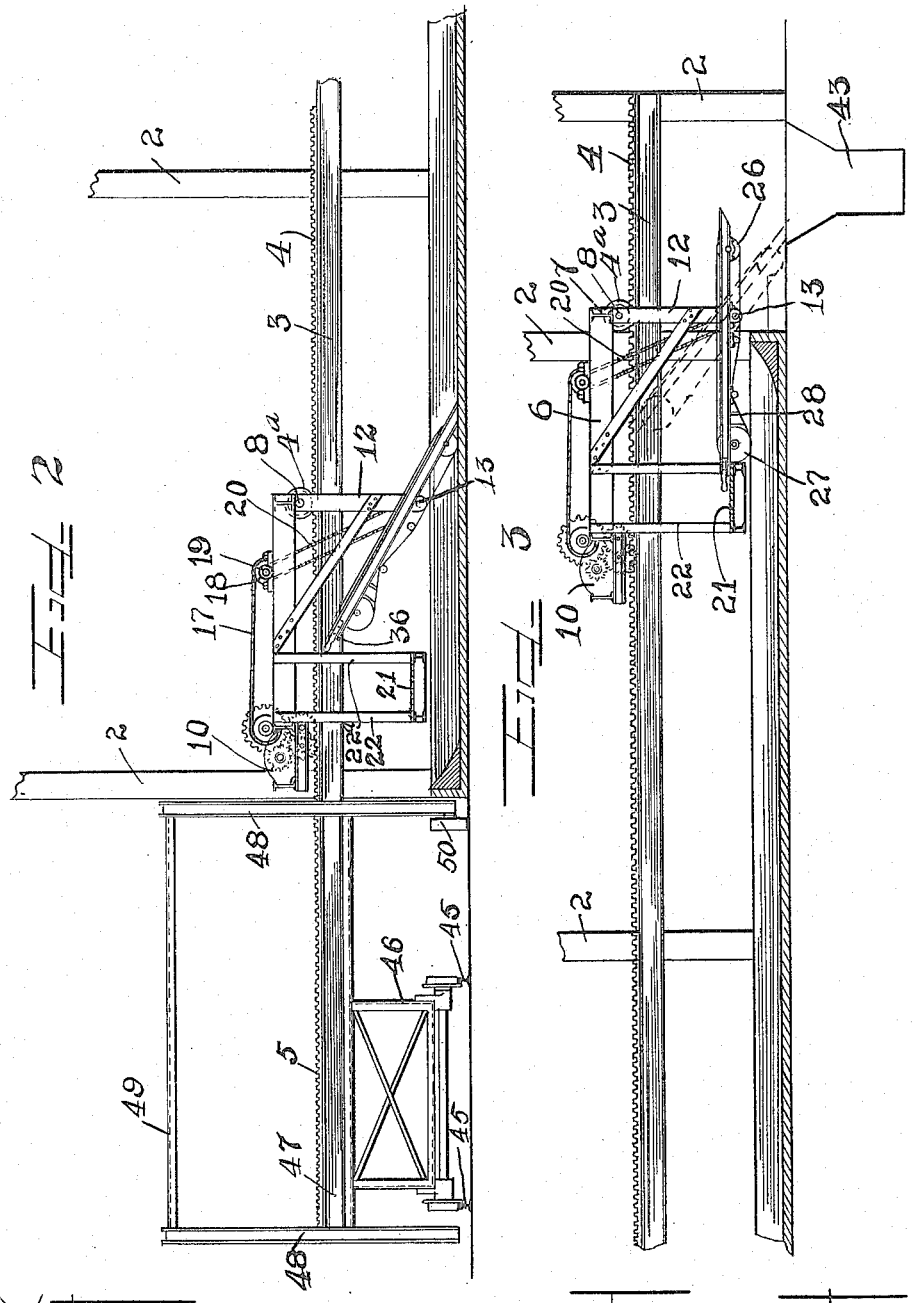

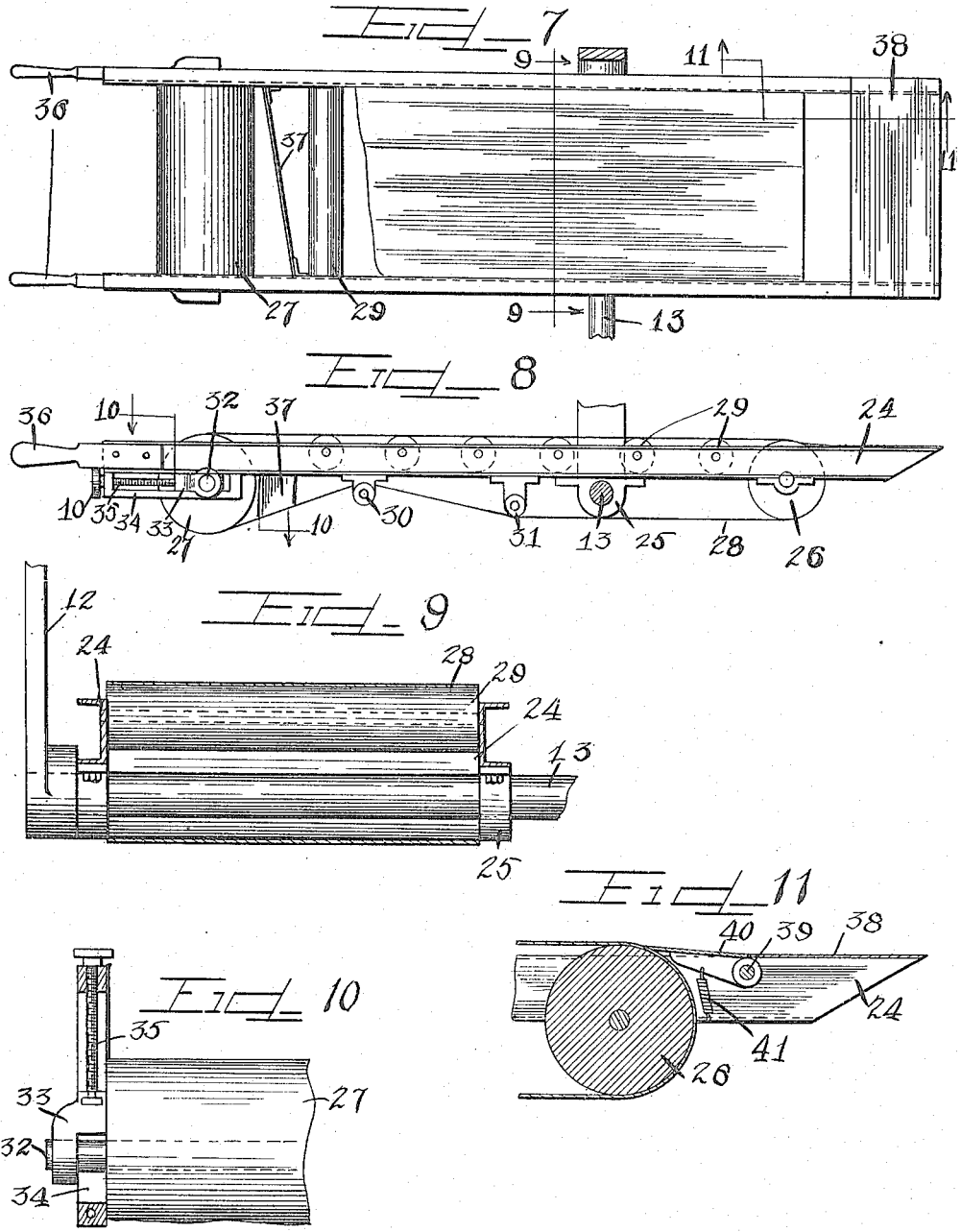

C. F. BLACK.
STARCH SHOVEL.
APPLICATION FILED OCT. 30, 1911.
1,131,318.
Patented Mar. 9, 1915.
6 SHEETS—SHEET 5.
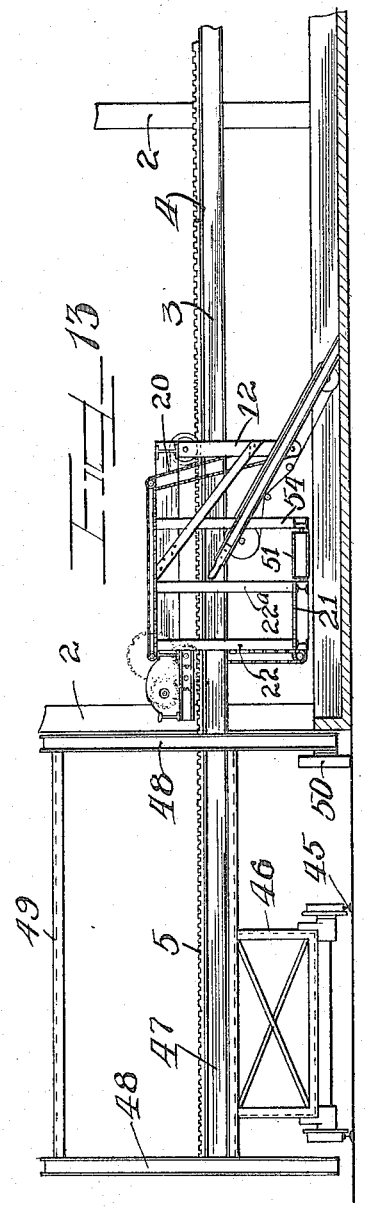
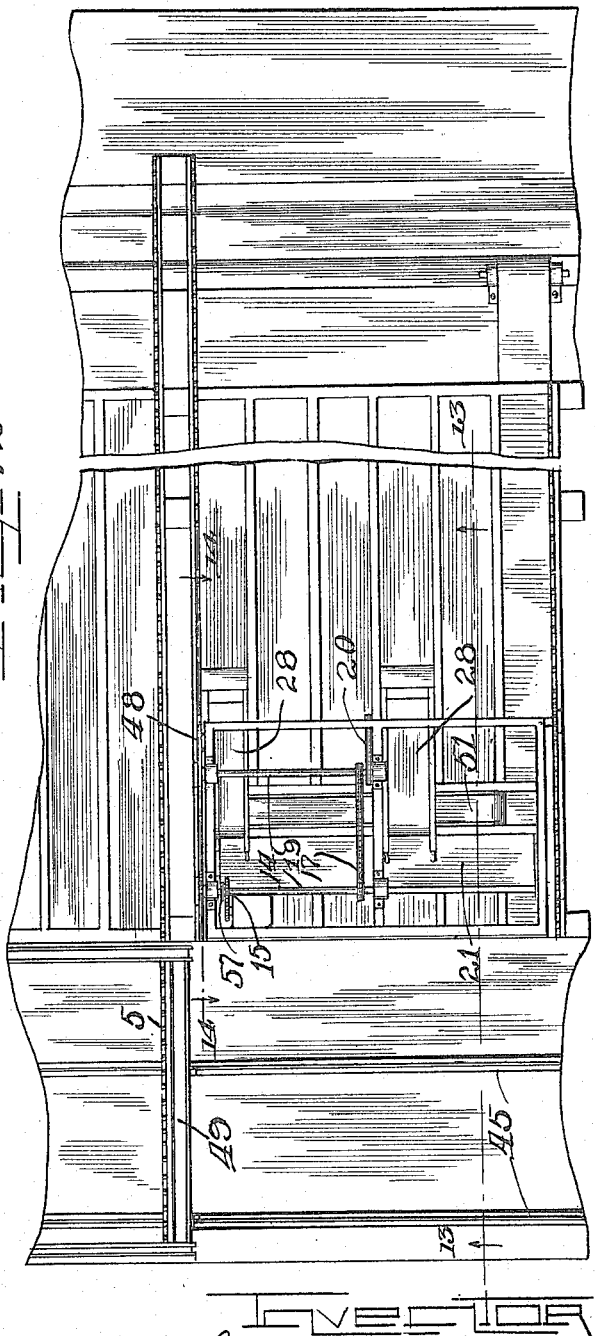

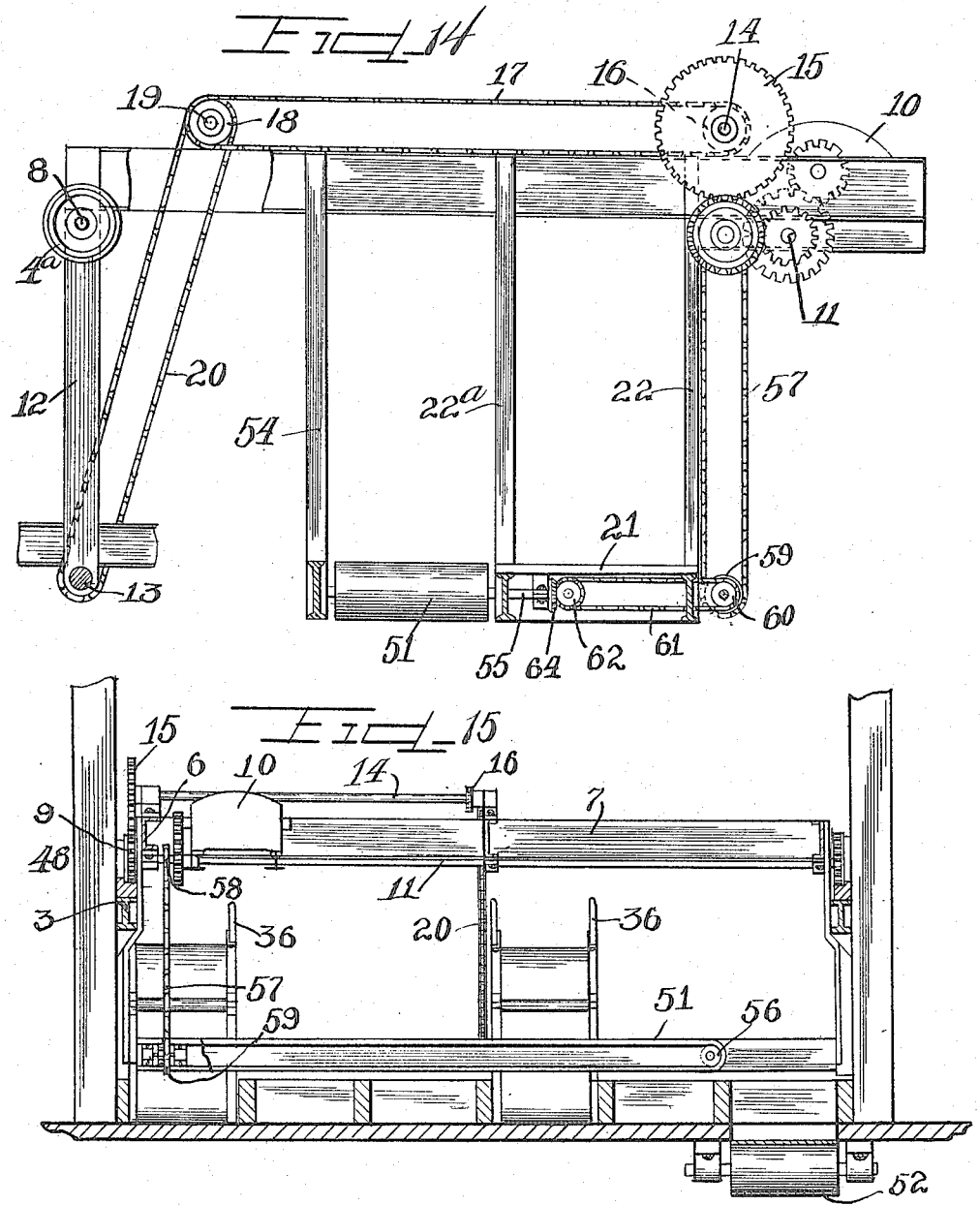

UNITED STATES PATENT OFFICE.

CHARLES F. BLACK, OF WAUKEGAN, ILLINOIS.

STARCH-SHOVEL.

1,131,318. Specification of Letters Patent. Patented Mar. 9, 1915.

Application filed October 30, 1911. Serial No. 657,589.

*To all whom it may concern:*

Be it known that I, CHARLES F. BLACK, a citizen of the United States, and a resident of the town of Waukegan, in the county of Cook and State of Illinois, have invented certain new and useful Improvements in Starch-Shovels; and I do hereby declare that the following is a full, clear, and exact description of the same, reference being had to the accompanying drawings, and to the numbers of reference marked thereon, which form a part of this specification.

In the manufacture of starch and certain other products, the material is collected in long and comparatively shallow settling troughs or tanks, and when the desired constituency has been reached by the evaporation or the draining off of the water, or by the precipitation of the solid matter contained howsoever achieved, the starch or other commodity is shoveled or removed from the tanks or troughs and the operation repeated.

Heretofore, usually, the troughs have been cleared by shoveling by hand and the starch or other commodity is removed therefrom to a place of general deposit for the product, or to mechanism for further treatment. In any event, the expense incurred in discharging the product from the troughs is very considerable, owing to the very large area, and the necessity of using a large number of men for this purpose to prepare the troughs for the next succeeding batch. Furthermore, it is necessary for the workmen (as the operation has heretofore been conducted) to stand in the trough while removing the material, and this, of course, is objectionable.

The object of this invention is to afford power operated shovels, by the use of which the products may be discharged from the troughs with the least expenditure of time, and which are so constructed as to enable the work to be performed without the operator entering the troughs.

It is also an object of the invention to afford in a device of the class described a gang of shovels mechanically operated, and acting on two or more troughs simultaneously to discharge the contents therefrom, and in which the shovel is so constructed as to reduce friction of the material thereon, both in loading the shovel and in discharging.

It is also an object of the invention to afford mechanism whereby a gang of shovels may be used for any and all of a number of groups of troughs, and to afford mechanism for radially transferring the shovels from one to another of said groups of troughs.

It is also an object of the invention to afford a construction in which the shovels are provided with an anti-friction movable carrying bed at the bottom, to facilitate the loading of the shovel and the emptying of the same.

A preferred form of the invention is hereinafter illustrated and described.

In the drawings: Figure 1 is a fragmentary top plan view of the device embodying my invention and its installation. Fig. 2 is a section on line 2—2 of Fig. 1, showing the machine in side elevation. Fig. 3 is a similar section, showing the shovel in carrying position, and ready to dump. Fig. 4 is an enlarged rear elevation thereof, with the troughs in section. Fig. 5 is an enlarged section on line 5—5 of Fig. 1, and partly broken away. Fig. 6 is an enlarged, fragmentary section of the rail and rack, showing one of the crane wheels partly in elevation. Fig. 7 is an enlarged top plan view, partly broken away, of a shovel embodying my invention. Fig. 8 is a side elevation thereof. Fig. 9 is a section on line 9—9 of Fig. 7. Fig. 10 is a section on line 10—10 of Fig. 8, and illustrating the tightening mechanism for the apron. Fig. 11 is a fragmentary section taken on line 11—11 of Fig. 7. Fig. 12 is a fragmentary top plan view of a modification of a device embodying my invention. Fig. 13 is a section on line 13—13 of Fig. 12, showing a side elevation of a device embodying my invention in its modified form. Fig. 14 is an enlarged fragmentary section on line 14—14 of Fig. 12. Fig. 15 is an enlarged rear elevation of a modified form of my invention, showing the troughs in section.

As shown in the drawings: The starch floor (which may be taken as typical of the operating floor of many other products, such as salt or sugar and some others), is provided with a succession of parallel groups of troughs A, B and C, each group comprising a number of long and relatively shallow and narrow troughs 1, arranged transversely of one of the dimensions of the building in which contained, between the successive posts 2 of the bents of the building frame. Secured on said posts at a suitable height above the troughs, on longitudinally extending beams 3, are track rails 4, having on the inner side thereof, or the side adjacent the troughs, a parallel rack 5, extending substantially the entire length of the trough. A traveling crane comprising a suitable frame consisting of end members 6, and transverse side members 7, to afford a rectangular frame (and, as shown, constructed of structural metal) is supported upon the track wheels 4ª, by means of shafts 8. extending the length of said frame transversely the troughs beneath each of the frame members 7.

As shown, a gear wheel 9, is secured on each end of the shaft 8, to mesh with the rack 5, and is positioned closely adjacent to the track wheel 4ª, at each end of the frame at the rear side thereof. Mounted on said frame at its rear side, is an electric or other suitable motor 10, connected as usual, or in any suitable manner by means of a train of gears to drive to one of the geared wheels 9, on the shaft 8, to propel said crane in either direction upon its track.

Supported at the front side of the crane, is a depending bracket or arm 12, which extends to near the top walls of the trough and journaled at the lower ends of which is a shaft 13. Journaled at the top of the frame and above the rear shaft 8, is a shaft 14, and rigidly secured thereon is a gear wheel 15, which meshes with the gear wheel 9, before described. Secured on said shaft also, is a sprocket wheel 16, shown in dotted lines in Fig. 5, and about which is trained a sprocket chain 17, which is also trained about a sprocket wheel 18, secured on a shaft 19, at the front side of the frame, and which drives a sprocket chain 20, also trained about a second sprocket wheel on said shaft 19, and trained about a sprocket wheel secured on the shaft 13, to continuously rotate said shaft from the motor.

An operator's platform 21, is suspended on suitable brackets 22—22ª below the frame and near the rear side thereof, and slightly above the troughs, and extends for the entire length of the frame. Two shovels are pivotally supported on the shaft 13, as shown in Figs. 2 and 3, and are adapted to be shifted thereon, each to operate in any of the troughs at one side of the center. Said shovels, as shown, comprise side frame members 24, constructed of structural steel or any suitable material and provided on the under side thereof with a bearing box 25, to receive the shaft 13, therethrough. Journaled on said side frame members 24, near each end thereof, are relatively large rollers 26 and 27, about which is trained a canvas or other suitable apron 28, the upper run of which is supported upon a succession of transverse, closely arranged rollers 29, of comparatively small diameter, which projects slightly above the top of the frame members 24, and, as shown, guide rollers 30, and 31, are secured in suitable bearings below said frame members to hold the apron out of contact with the shaft 13, at all times.

The gudgeons 32, for the roller 27, (which is at the rear end of the shovel), are journaled in bearing members 33, slidable in the slotted guide members 34, secured on the under side of each side frame member at the end thereof, and, as shown, an adjusting screw 35, is engaged on said slide bearings 33, and by rotation acts to shift the roller 27, longitudinally of the shovel frame to maintain any desired tension upon the apron. As shown also, handles 36, are provided, one on each side frame member at the rear end thereof, to extend into position, as shown in Figs. 2 and 3, to be conveniently engaged by the operator standing on the platform 21, and are of sufficient length to rest on said platform, as shown in Fig. 3, to support the shovel horizontally when the shovel is loaded. Secured also transversely the side frame members between the tightener roller 27, and the adjacent roller 29, is an obliquely inclined scraper 37, the edge of which impinges the inner side of the apron to scrape any adherent material therefrom, and, owing to the oblique set of said scraper, direct such material therefrom. At the front end of the shovel frame is secured a relatively thin plate 38, which affords the cutting nose of the shovel to engage beneath the material in the trough, and deflects the same upwardly, and supported upon a transverse shaft 39, at the rear of said plate 38, is a rearwardly directed bottom plate 40, the rearwardly directed edge of which at all times bears upon the apron at the forward side of the roller 26, and, as shown, a tension spring 41, is engaged thereon and engaged to one of the side frame members and acts to hold the side frame members in positive engagement at all times.

Each trough at its front end, as shown in Fig. 3, inclines upwardly at its bottom to the top thereof to deflect the front end of the shovel upwardly at the end of the trough. Extending transversely the troughs at their front ends, is an elongated receiving hopper 43, into which the material collected by the shovel, is dumped, and in the bottom of which may be provided any suitable conveyer, if desired, (but which, for convenience, is not shown) to discharge the material delivered thereinto to any suitable place of deposit. Extending transversely the troughs beyond their rear ends, are parallel track rails 45, upon which is supported a suitable truck or car 46, having arranged transversely thereof or parallel the track rails and racks 4 and 5, beams 47, on which are secured track rails and racks corresponding with, and of the same gage as the track rails and racks 4 and 5, before described, for each group of troughs. Said beams are rigidly braced in parallel position by means of parallel, upwardly directed channel bars or other structural bars 48, corresponding in position relatively with the posts 2, and connected at their tops and bottoms, but affording sufficient clearance for the entry of the crane therethrough upon said tracks. As shown also, said brace frames are connected at their tops by means of tie bars 49, and, as shown, a roller or truck 50, may be provided at the lower end of the forward frame members 48, to bear upon the floor while the train is entering the same or, if desired, the truck or carriage may be counterweighted upon its rear side, as preferred.

The construction shown in Figs. 12 to 15 inclusive, is practically identical with that shown in Figs. 1 to 11, with the exception of the fact that the apron 28, delivers the material to a carrier or apron 51, which conveys the material transversely of the troughs and delivers the same upon a continuously actuated conveyer 52, which in turn conveys the material parallel the troughs and deposits the same in a suitable receiving hopper 43.

As shown in Figs. 12 to 15 inclusive, a bracket 54, is positioned slightly in advance of the operator's platform, and rollers 55 and 56, having an apron 51, trained about the same, are journaled between the bracket 54, and the bracket 22ª. A sprocket chain 57, is trained about a sprocket wheel 58, secured upon the shaft 8, and a sprocket wheel 59, rotatably secured upon a stud shaft. As shown, a sprocket wheel 60, is secured to rotate with said sprocket wheel 59, and a sprocket chain 61, is trained about the sprocket wheel 60, and a sprocket wheel 62, which acts to rotate the beveled pinion 63, which acts to drive the beveled gear 64, to rotate the roller 55, and thereby actuate the conveyer 51, to deliver the material transversely of the troughs. A conveyer 52, is positioned to receive the material as it is delivered from the conveyer 51, and is operated in any suitable manner to convey the material to the receiving trough or hopper 43.

The operation is as follows: The starch (or other material) having reached the proper consistency for removal from the troughs, the operators (one for each shovel) take their position upon the operating platform 21, and the crane, beginning at the rear end of the trough, and while supported partly upon the beams 47, positions the shovels to begin the removal of the material from the troughs. If desired, the operators may have shoveled the starch or other material, from the extremity of the trough, forwardly sufficiently to permit the nose of the shovel to enter over the end of the trough, or the end of the trough may be inclined, if preferred, to obviate the necessity of any manual shoveling whatever. With the nose of the shovels bearing upon the bottom of the trough, and beneath the edge of the layer of material therein, the crane is impelled forwardly, thus sliding the shovel beneath the material, the sharp cutting edge of the blade 38, cleaving the same from the bottom. As the shovel moves forwardly, the material slides upwardly to the apron, which, by the rotation of its rollers, moves upwardly with the material, thus materially reducing the friction due to the filling of the shovel. When the layer of material has filled the shovel, the handles are quickly pressed down to bring the shovels to horizontal position, and in this position the crane travels forwardly to dumping position, as shown in Fig. 3, where the handles are elevated, as shown in dotted lines, the direction of the travel of the apron is reversed, owing to the gravity of the material thereon, and the material slides into the hopper 43. The direction of travel of the crane is then reversed to bring the shovel back to loading position, and the operation is repeated until all the material is removed from the trough. In dumping, the blade 40, serves as a scraper to remove all the adherent material from the outer surface of the apron. The inclined scraper 37, acts to remove any adherent material from the inner surface of the apron, and, owing to its being set obliquely with the apron, discharges such material outwardly therefrom. The shaft 13, upon which the shovels are supported, rotates constantly. In consequence, when all the material is removed from one trough, the shovel may be adjusted for any succeeding trough by simply pressing the same laterally at the handles. The rotation of the shaft 13, facilitates this lateral adjustment and enables it to be accomplished without any tendency of jamming on the shaft. When the troughs of one group are emptied, the machine is run back upon the car 46, and the car, carrying the crane thereon, is moved forwardly to another group, and the rails and racks supported on the car are brought into register with the racks and rails, at each side of such group. The operation is now repeated as before described.

The operation of the modification shown in Figs. 12 to 15 inclusive, is the same in all respects as that shown in Figs. 1 to 11 inclusive, with the exception that the apron or conveyer 28, delivers the material from the troughs to the transverse conveyer 51, which in turn delivers the same upon the conveyer 52, which conveys the material to the receiving trough or hopper 43.

Of course, while I have referred to starch in the specification as the material to be handled by the shovels, it is to be understood that the machine is applicable for many other purposes and materials. Of course, the particular form of crane or traveling carriage for the shovel employed, may vary, and numerous details of the construction and operation may be widely varied, without departing from the principles of this invention. I therefore do not purpose limiting the patent to be granted on this application otherwise than necessitated by the prior art.

I claim as my invention:

1. In a machine of the class described the combination with a plurality of parallel troughs, of a traveling power operated carriage movable thereover, a support thereon for an operator, a manually operated shovel pivotally supported on said carriage to raise, carry and discharge the material, and a rotatable support for said shovel whereon the same may be shifted laterally from trough to trough.

2. In a machine of the class described the combination with a plurality of parallel troughs, of a traveling power operated carriage movable thereover, a support thereon for an operator, a manually operated shovel supported on said carriage to raise, carry and discharge the material therefrom, and a rotatable shaft on which said shovel is pivotally supported and whereon the same may be shifted laterally from trough to trough.

3. In a machine of the class described the combination with a plurality of parallel troughs, of a traveling power operated crane movable thereover, longitudinally the troughs, a platform thereon for an operator, a manually operated shovel on said crane acting to raise, carry and discharge the material from the troughs, a rotatable shaft whereon said shovel is pivotally supported and whereon the same may be shifted laterally from trough to trough, said shovel in carrying position assuming a horizontal position partly supported on the platform.

4. In a machine of the class described a plurality of groups of parallel troughs, a track arranged longitudinally each group of troughs, a power driven crane movable over the troughs on any of said tracks, one or more shovels adjustably supported on said carriage to operate in one or more of the troughs of a group, a transversely operating transfer carriage adapted to receive said crane thereon and to deliver the same in position to enter the track for a succeeding group of troughs, and an operator's platform on the crane adapted to afford a support for the shovel or shovels in carrying position.

5. A machine of the class described embracing a power driven shovel having a cutting nose for engaging and lifting the material, and a movable or anti-friction bed to receive the material thereon, and facilitate discharge therefrom, and a scraper positioned at the receiving end of the shovel to clear the surface of said movable bed as the material is discharged therefrom.

6. A machine of the class described embracing a power driven carriage, a shovel pivotally supported thereon embracing a cutting nose for engaging and lifting the material, a movable or anti-friction bed to receive the material and facilitate discharge therefrom, a scraper positioned to clear the surface of said movable bed as the material is discharged therefrom, and means supporting the shovel horizontally when loaded.

7. A machine of the class described embracing a power driven carriage or crane, a platform for an operator, a shovel pivotally supported on the crane and embracing a cutting nose for engaging and lifting the material, a movable or anti-friction bed to receive the material thereon, and facilitate discharge therefrom, handles to support the shovel horizontally on the platform, and a scraper positioned to clear the surface of said movable bed as the material is discharged therefrom.

8. In a device of the class described a movable carriage, a shovel pivotally supported thereon, embracing parallel frame members, a cutting nose thereon, rollers journaled transversely the frame, an endless apron thereon, the upper run thereof affording a movable bed for the material in loading, and adapted to reverse its movement in dumping by gravity, and scrapers positioned to clean the surfaces of the apron.

9. In a device of the class described a power driven crane, a shovel thereon embracing frame members, a cutting nose thereon, rollers journaled transversely the frame, an endless apron thereon, the upper run thereof affording a movable bed for the material in loading, and adapted to reverse its movement in dumping by gravity, and means supporting the shovel horizontally when loaded.

10. In a machine of the class described a constantly rotating shaft, a shovel pivotally supported thereon to slide longitudinally thereof in adjusting the shovel laterally, and power operated means for impelling the shovel in loading and carrying the same with its load to a point of discharge.

11. In a machine of the class described a rotative shaft, a shovel pivotally supported thereon and slidable longitudinally thereof, and power operated means for impelling the shovel in loading and carrying the same with its load to a point of discharge.

12. In a device of the class described, a plurality of parallel troughs, a power operated traveling carriage movable parallel therewith and shiftable transversely thereof, said carriage extending over a plurality of said troughs, and a shovel carried on the carriage and adapted to operate in any of said troughs to raise, carry and discharge the material therefrom, said shovel being shiftable in said carriage laterally of said troughs.

13. In a device of the class described, a plurality of parallel troughs, a power operated traveling carriage movable parallel therewith and shiftable transversely thereof, said carriage extending over a plurality of said troughs, a shovel carried on the carriage and adapted to operate in any of said troughs to raise, carry and discharge the material therefrom, said shovel being shiftable in said carriage laterally of said troughs, and a conveyer supported by said carriage and adapted to receive the material as it is discharged from the shovel and convey it transversely to a place of discharge.

14. In a device of the class described, a plurality of parallel troughs, a power operated traveling carriage movable parallel therewith and shiftable transversely thereof, said carriage extending over a plurality of said troughs, a shovel carried on the carriage and adapted to operate in any of said troughs to raise, carry and discharge the material therefrom, said shovel being shiftable in said carriage laterally of said troughs, a conveyer adapted to receive the material from the shovel and convey the same transversely of the troughs, and a conveyer adapted to receive the material from the transverse conveyer and convey the same to a place of deposit.

15. In a machine of the class described the combination with a plurality of troughs, of a traveling carriage movable thereover, a platform thereon for an operator, a shovel on said carriage acting to discharge the material from the troughs, a shaft whereon said shovel is supported and whereon the same may be shifted laterally from trough to trough, said shovel adapted to assume a horizontal position when one end of the same is supported on the platform.

16. In a machine of the class described a plurality of groups of troughs, each comprising a plurality of troughs, a track for each group of troughs, a carriage movable on any of said tracks, a plurality of shovels adjustably supported on said carriage to operate in any of the troughs of a group, and a transfer carriage adapted to receive said carriage thereon and to deliver the same in position to enter the track for a succeeding group of troughs.

17. In a machine of the class described a plurality of groups of troughs, each comprising a plurality of troughs, a carriage movable above any of said groups of troughs, a shovel supported on said carriage to operate in any of the troughs of a group, and a transfer carriage adapted to receive said carriage thereon and to deliver the same in position above a succeeding group of troughs.

18. In a machine of the class described a plurality of groups of troughs, a track arranged longitudinally each group of troughs, a carriage movable over the troughs on any of said tracks, shovels adjustably supported on said carriage to operate in the troughs of a group, a transfer carriage adapted to receive said crane or carriage thereon and to deliver the same in position to enter the track for a succeeding group of troughs, an operator's platform on the carriage or frame adapted to afford a support for the shovel or shovels in carrying position, a conveyer adapted to receive the material from shovels and convey the same transversely of the troughs, and a conveyer adapted to receive the material from the transverse conveyer and convey the same to a place of deposit.

19. In a machine of the class described, a shaft, a shovel supported thereon to slide longitudinally thereof in adjusting the shovel laterally, said shovel being pivotally mounted intermediate its length on said shaft, and means for impelling the shovel in loading and carrying the same with its load to a point of discharge.

20. A machine of the class described, embracing a power driven shovel having a cutting nose for engaging and lifting the material, and a movable belt to receive the material thereon and facilitate discharge therefrom, and scrapers positioned on both sides of said belt to clear the surface thereof as the material is discharged therefrom.

In testimony whereof I have hereunto subscribed my name in the presence of two subscribing witnesses.

CHARLES F. BLACK.

Witnesses:
LAWRENCE REIBSTEIN,
CHARLES W. HILLS, Jr.

Copies of this patent may be obtained for five cents each, by addressing the "Commissioner of Patents, Washington, D. C."